INVENTOR.
FREDERICK W. GRUNER
BY
Andrus & Starke
ATTORNEYS

United States Patent Office 3,424,959
Patented Jan. 28, 1969

3,424,959
SPLIT PHASE INDUCTION MOTOR SOLID STATE POSITION CONTROL WITH BRAKING AT BALANCE
Frederick W. Gruner, Milwaukee, Wis., assignor to Jordan Controls, Inc., Milwaukee, Wis., a corporation of Wisconsin
Filed Sept. 24, 1964, Ser. No. 401,759
U.S. Cl. 318—18          6 Claims
Int. Cl. H02p *1/54, 5/46, 7/68, 7/74*

ABSTRACT OF THE DISCLOSURE

A two-phase motor is provided having a pair of windings having a common terminal and individual forward and reverse rotating terminals which are connected by a capacitor. The motor is selectively energized for forward or reverse direction through operation of either one of a pair of normally closed directional control relay switches, one of which is connected to a forward terminal and the other to the reverse terminal. A normally open brake control relay switch interconnects the forward and reverse directional switches to A.C. power lines. The standby relay circuit is such that the relays are de-energized and the brake relay switch is open while both of the directional relay switches are closed. The directional control relays are essentially instantaneously operative to open and close the directional switch means. The brake relay, however, is instantaneously operative only to close its brake switch and has a time delayed dropout. To drive the motor in a selected direction, the relay of the opposite switch and the brake switch are energized and simultaneously open and close the associated switches. This provides a circuit to energize the motor in the selected direction. When the motor is to be stopped, both of the actuated relays are reset to the original position. However, the brake relay is provided with the timed control on the return to the initial position and maintain power to the forward and the reverse switch means, respectively, which are now both in the condition to apply power to the respective windings. Consequently, power is simultaneously applied for a timed period to both windings sufficiently long to produce high dynamic braking which will rapidly bring the motor to standstill but not sufficiently long to damage the motor.

Figure 1:
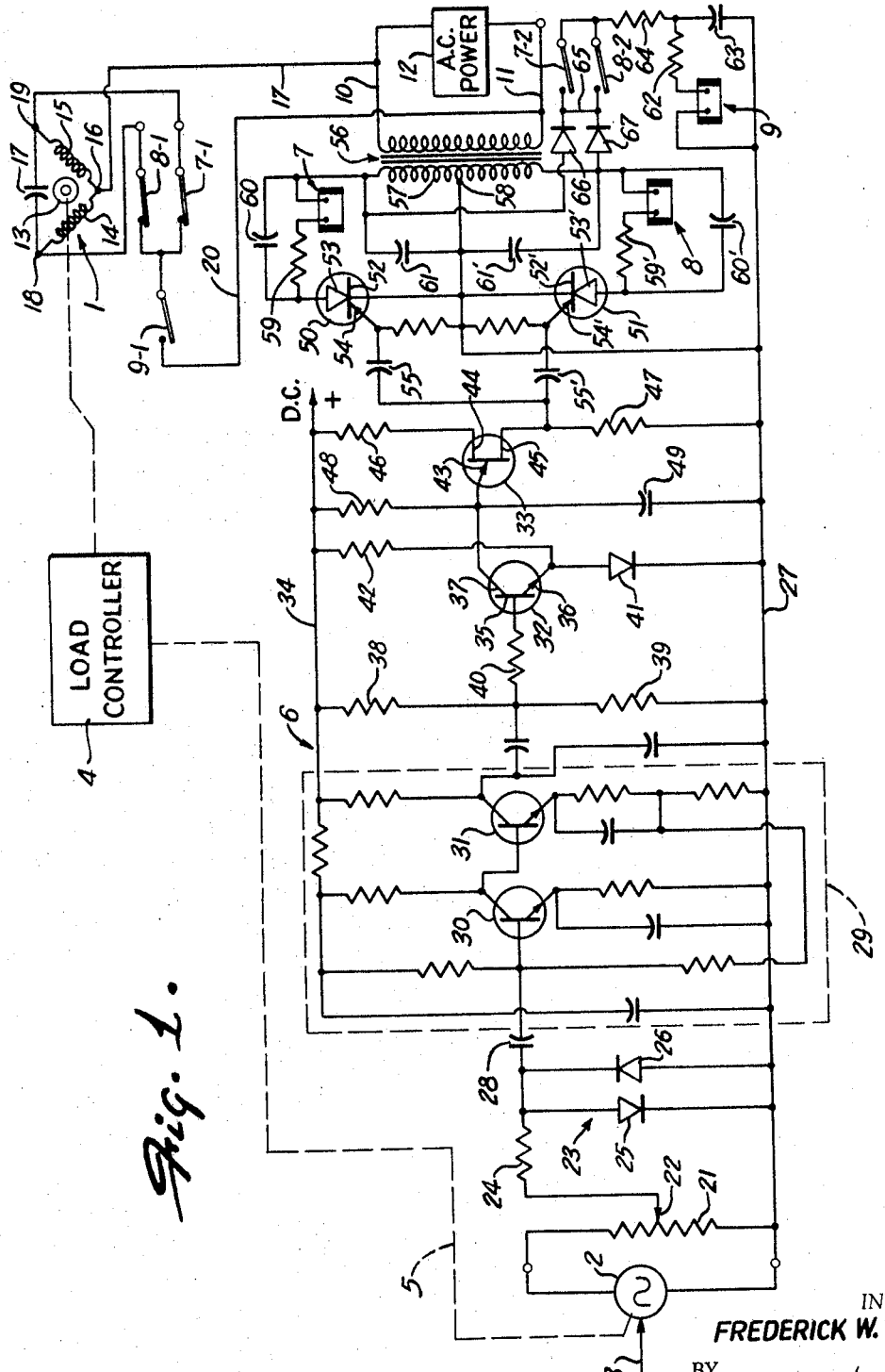

Solid state switching circuits for the relay switches are also disclosed.

---

This invention relates to a braking control circuit and system for multiple phase actuators and particularly to a relay servo amplifier and braking circuit for controlling a motor actuator of the two phase variety which is connected in a closed loop type of control system.

In closed loop control systems, a reference signal is proportional to a selected output or load function and is compared with a feedback signal proportional to the actual function to produce an error signal which is fed into a suitable control including a servo motor to actuate an electrically responsive function controller. The servo motor may be either an alternating current (A.C.) or a direct current (D.C.) type. The present invention is particularly directed to an alternating current two-phase motor having a pair of windings with the direction of rotation controlled by the power circuit connection of the motor.

Generally, in the control of servo motors a relay switching system is pulsed to reduce the speed of the actuator immediately before null and to thereafter apply mechanical or dynamic braking to bring the motor to the null position. To dynamically brake the actuator, D.C. may be applied to the A.C. winding or the motor may be plugged, i.e. energized for the reverse direction, just immediately before the null position is reached.

Although various systems have been employed, they have distinct disadvantages from the standpoint of complexity, reliability and life. Relay pulsing to stop the motor may cause substantial contact wear with a reduction of reliability and life of the system. Mechanical braking methods are inherently somewhat slower and more costly than the dynamic braking system. However, dynamic braking and particularly plug-type reversing requires relatively sophisticated and complex circuitry. This is particularly true of plug-type controls which tend to reverse the direction away from null unless accurately time controlled.

In accordance with the present invention, a two-phase motor is provided having the windings selectively connected for forward and reverse directional movement in accordance with the polarity of the feedback signal. The motor is driven until it approaches the null position at which time the energizing circuit is effectively eliminated and the alternating current power is applied to the windings of the motor simultaneously for a short time period which creates high dynamic braking in accordance with known theory. In accordance with the present invention, a timing means provides for the simultaneous de-energization of the driving force while maintaining a dynamic braking energization of both windings for a short selected period which will be sufficient to rapidly bring the motor to a halt but insufficient to cause damage to the motor. In accordance with a preferred construction of the present invention providing a highly novel and operable system, the motor is selectively energized for forward or reverse direction through normally closed directional control switch means. In addition, a normally open brake control switch means interconnects the forward and reverse directional switch means to power and provides automatic insertion of braking power upon the effective drive de-energization. The directional control switch means may be connected in parallel to an incoming power source through the brake switch means and separate relay means provided for each switch means. The standby relay circuit is such that the relay means are de-energized and the brake switch means is open while both of the directional switch means are closed. The directional control relay means are essentially instantaneously operative to open and close the directional switch means. The brake relay means, however, is instantaneously operative only to close its brake switch means and has a time delayed dropout. To drive the motor in a selected direction, the relay of the opposite switch means and the brake switch means simultaneously open and close the associated contacts. This provides a circuit to energize the motor in the selected direction. When the motor is to be stopped, both of the actuated relay means are reset to the original position. However, the brake switch means is provided with the timed control on the return to the initial position and maintain power to the forward and the reverse switch means, respectively, which are now both in the condition to apply power to the respective windings. Consequently, power is simultaneously applied for a timed period to both windings sufficiently long to produce high dynamic braking which will rapidly bring the motor to standstill but not sufficiently long to damage the motor.

A highly satisfactory commercial product based on the present invention has been constructed incorporating a solid state control means for energizing of the motor windings through the use of relay switching means. In accordance with the commercial aspects of the present invention, a solid state trigger forming circuit controls conduction of a pair of silicon controlled rectifiers which are interconnected one each with each of the direction control relays. The rectifiers and relays are connected to energize each relay during an alternate half cycle of an A.C. reference power source. The gate of each silicon controlled rectifier is controlled by a pulse generated from the error signal which is synchronized with A.C. signal applied to the rectifiers. The error signal may be amplified and control a unijunction transistor pulse generator having an input capacitor connected to a control electrode of a unijunction transistor as follows. The error signal is fed to a bypass or cutoff transistor which normally prevents the capacitor from charging and thereby holds the unijunction transistor cutoff. When a selected error signal is received, bypass transistor is turned off, the capacitor charges through a timing circuit to intermittently trigger the unijunction transistor in accordance with known operation to provide a pulse train into the silicon controlled rectifier.

The brake relay is connected in circuit to be energized when either the forward or the reverse relays is energized. Thus, relay contacts of the two directional control relays may be connected in parallel in a power circuit to the brake relay. Additionally, a timing capacitor or similar device is interconnected to maintain the brake relay energized for a selected time period after opening of the input circuit thereto. As the rectifiers are supplied with the alternate half cycles from the main power transformer and as the pulse train is synchronized with the A.C. signal, the trains will be of the same or diametrically opposite phase depending upon the zero or 180° characteristic of the input error signal. The pulse train will therefore be in phase with the anode voltage of only one of the pair of silicon controlled rectifiers and result in proper energization of only the forward or the reverse motor drive relay simultaneously with the brake relay. When a null position is reached, the error signal will be reduced below the selected operating level for cutting off of the bypass transistor. As a result, the capacitor input to the unijunction transistor will be eliminated and the breakdown level of the unijunction transistor will not be established. Consequently, neither of the direction control relays or the brake relay will be energized and the associated relay will return to the standby position except that the brake relay contacts remain closed for a timed period to provide timed braking to null.

Switching systems other than relay systems may be employed. For example, solid state switching means may be employed as hereinafter described.

The present invention provides a simple and reliable motor braking system control circuit which avoids excessive actuation of relay contacts, the necessity for a mechanical brake and the complex timing circuits of plug reversal methods of stopping the motor without causing reversal of operation.

The drawing furnished herewith illustrates preferred constructions of the present invention and clearly discloses the above advantages and features of the present invention as well as others which will be clear from the following description.

Figure 2:
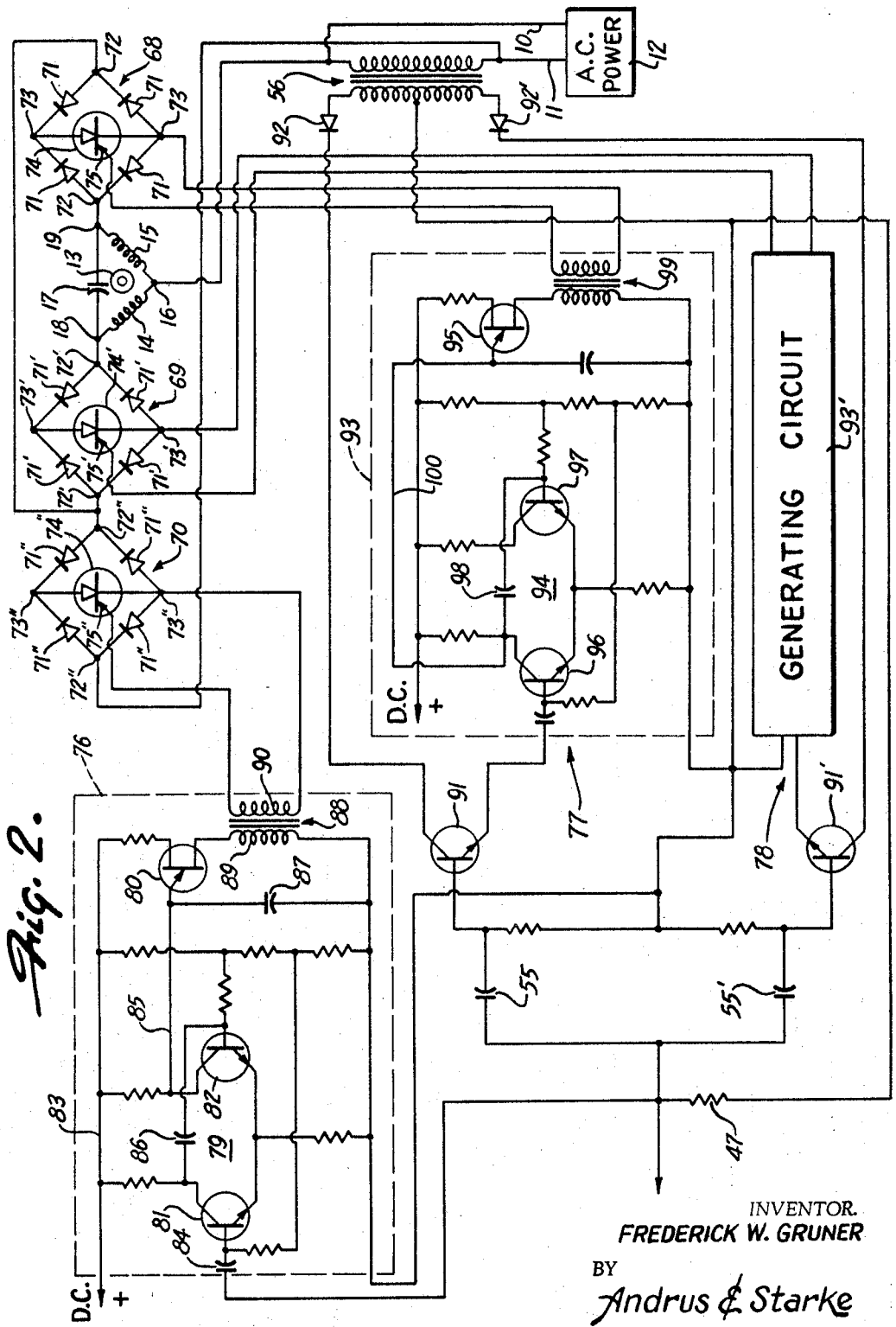

In the drawing:

FIG. 1 is a schematic circuit of a closed loop system employing a relay controlled two-phase motor; and FIG. 2 is a partial modification of the circuit of FIG. 1 illustrating a solid state switching means.

Referring to the drawing and particularly to FIG. 1, a two-phase servo motor 1 is schematically shown connected to be driven in accordance with the output of an error signal generator 2. An input command line 3 is connected to the signal generator 2 to provide a preset operating bias to the generator. The generator 2 is also connected to a load controller 4 as shown by the dashed coupling line 5 to be oppositely actuated. The output of generator 2 is therefore an error signal related to the difference between the preset and feedback signals and is employed to control motor 1 and return the load to a selected position or function in accordance with the input command, as follows.

The output of the generator 2 is connected to a relay servo amplifying system or unit 6 which has an output connected to control the energization of a forward relay 7 and a reverse relay 8 and a brake relay 9. The respective relays 7–9 include contacts identified by the corresponding relay number and subnumbers for purposes of clarity and simplicity of explanation. The several relay contacts interconnect the two-phase servo motor 1 to a pair of A.C. power or source lines 10 and 11 which are connected to a suitable source 12 of alternating current power such as the conventional 110 volt A.C. power distribution system. Thus, the illustrated servo motor 1 is diagrammatically shown having a rotor 13 coupled to the load controller 4. A forward winding 14 and a reverse winding 15 are carried by a stator structure, not shown, and electromagnetically coupled to the rotor 13. The windings 14 and 15 are connected at one end to form a common input terminal 16 connected directly to the power line 10. A capacitor 17 connects the opposite ends of the forward winding 14 and the reverse winding 15 and defines a pair of input terminals 18 and 19 connected to the opposite power line 11 by the contacts of the several relays 7–9 via a common line 20. The brake relay contacts 9–1 of the brake relay 9 are inserted in the connecting line 19. The relay contacts 9–1 are normally open contacts and thereby maintain the circuit to the motor open. Contacts 7–1 of the forward relay 7 are connected between the contacts 9–1 and terminal 19 to the one side of reverse winding 15. Reverse relay contacts 8–1 of the reverse relay 8 are similarly connected between the contacts 9–1 and the terminal 18 of the forward winding 14. Contacts 7–1 and 8–1 are both normally closed contacts to condition the circuit for supplying power to the respective forward winding 14 and the reverse winding 15 as a result of the closing of the contacts 9–1.

Generally, the operation of the circuit shown in the drawing may be briefly summarized as follows. The amplifier 6 is fed with a low level alternating current electrical error signal which is the result of a comparison of the command input at input 3 and the feedback derived through the controller 4. This energizes the relay servo amplifier 6 to produce an output related to the correction to be effected by the servo motor 1 to establish a selected condition of the load. If the motor 1 is to be driven in a forward direction, the output of the amplifier 6 is such as to energize the forward relay 7 and consequently the forward relay contacts 7–1 open to open the direct circuit to winding 15 while the direct circuit to winding 14 through the contacts 8–1 is maintained. Simultaneously, the brake relay 9 is energized to close its contacts 9–1 and power is supplied to the motor 1 via winding 14 in parallel with capacitor 17 and winding 15 such that the motor 1 rotates in the forward direction. The motor 1 will reset the load controller 4 and therefore the load and accordingly vary the feedback signal. When the null position is approched, in accordance with the setting of the system, the error signal reduces effectively to zero and the energization of the forward relay 7 and the brake relay 9 is essentially simultaneously discontinued. The relay 7 immediately closes its associated contacts 7–1. However, the brake relay 9 is a timed relay and holds its contacts 9–1 in the closed position for a selected time period, normally in the order of .2 second. As a result, for that short time period, full line voltage from the A.C. source lines 10 and 11 is simultaneously applied directly across the forward winding 14 and the reverse winding 15 to dynamically brake the motor to a rapid stop in accordance with known theories of motor operation.

More particularly, in the illustrated embodiment of the invention, the error signal generator 2 is diagrammatically shown as an alternating current generator having its output related to a pair of inputs. For example, generator 2 may be a two-phase A.C. generator having a reference voltage winding connected to the source lines 10 and 11 via the command input 3 and an error signal winding connected to the load controller 4 to be energized in accordance with the level thereof. The phase and amplitude of the generator output is directly proportional to the relative energization by the respective feedback signal and the input command or reference signal. In any event, the output of the generator is synchronized with the power supplied to source lines 10 and 11 to provide a synchronized signal to the control relays, as presently described.

The illustrated relay servo amplifier 6 generally includes a presettable gain potentiometer 21 connected across the output of the signal generator 2 and having a signal tap 22 connected as an input to a limiter network 23. The illustrated network 23 includes a resistor 24 in series with a pair of parallel and oppositely polarized diodes 25 and 26 connected between the resistor 24 and a ground or reference line 27. If the error signal in either the negative or the positive half cycle rises above a selected level, the corresponding diodes 25 and 26 conduct and limit the signal applied to the input circuit of the relay servo amplifier 6. The limited signal is coupled through a coupling capacitor 28 to a two-stage amplifying section 29 including a pair of amplifying transistors 30 and 31. The transistors 30 and 31 are each connected in a common emitter configuration with the necessary biasing resistors and stabilizing components. As such circuits are well known to those skilled in the art, no further description thereof is given other than to note that it produces an amplified output signal which is fed to a trigger circuit.

The trigger circuit includes a control bypass transistor 32 connected to control the operation of a unijunction transistor 33.

The amplifying transistors 29 and 30 as well as the control transistor 32 and unijunction transistor 33 are connected to any suitable D.C. bias line 34 which may be connected to any suitable D.C. source. For example, line 34 may be connected directly to a full wave rectifier coupled to the power lines 10 and 11 through a suitable transformer.

The bypass transistor 32 is shown as a common emitter connected transistor having a base 35, an emitter 36 and a collector 37. A voltage dividing network including a pair of resistors 38 and 39 is connected between the bias line 34 and the reference or ground line 27. A resistor 40 is connected to the junction of the resistors 38 and 39 and to the base 35 to apply a selected positive voltage to the base with respect to the emitter 36 which is connected to ground in series with a diode 41 and to bias line 34 in series with a resistor 42.

The unijunction transistor 33 is a standard component well known in the art and is also only briefly described as including the control electrode 43 for controlling conduction between a pair of main electrodes 44 and 45 which are connected respectively to the bias line 34 and to the ground line 27 through suitable resistors 46 and 47. Electrode 45 constitutes the output terminal connected to the energizing circuit for the relays 7-9. A resistor 48 and a capacitor 49 are connected in series between line 34 and ground line 27 with the junction connected to the control electrode 43 of the unijunction transistor 33.

The control transistor 32 and the unijunction 33 selectively generate pulse signals for energizing of the relays in accordance with error signals from generator 2. The transistor 32 is normally conducting as a result of the bias resistors 38 and 39 such that its output circuit provides a bypass circuit across the capacitor 49. When the amplified incoming error signal is of a sufficient level, it cuts off the conduction through transistor 32. As a result, the capacitor 49 is charged by current flowing from line 34, through the resistor 48 and capacitor 49 to ground. When the capacitor voltage reaches the breakdown level of the unijunction transistor 33, the capacitor is suddenly discharged through the circuit of the control electrode 43 and the main electrode 45. This creates an output pulse across the resistor 47 to ground which is transmitted to trigger one of a pair of silicon controlled rectifiers 50 and 51. After the capacitor 49 discharges, the charging current again begins to flow and the cycle repeats itself with the capacitor charging and discharging as long as transistor 32 is cut off. The frequency of the trigger circuit is selected to form two or more pulses for each half cycle of the A.C. current and this pulse train triggers the silicon controlled rectifiers 50 and 51 associated respectively with the forward relay winding 14 and the reverse relay winding 15, respectively.

The circuits for the relays 7 and 8 are similarly constructed and the circuit for the silicon controlled rectifier 50 and the associated forward relay 7 is described in detail with corresponding connections and components of the rectifier 50 and relay 8 identified by similar primed numbers for purposes of simplicity of explanation.

The silicon controlled rectifier 50 includes a cathode 52 and an anode 53 connected in an output circuit with the relay 7. A gate 54 is connected by a coupling capacitor 55 to the output electrode 45 of the unijunction transistor 33 to receive a train of trigger pulses.

The main output circuit to the relay 7 includes an input transformer 56 having a secondary 57 connected in series with the rectifier 50 and the relay 7. In the illutrated embodiment of the invention, the secondary 57 includes a center tap 58 connected to reference or ground line 27 and forming a common return path for the energizing of the relays. The forward relay 7 includes a coil connected in series with a resistor 59 between the anode 53 and the high potential end of the secondary 57. A capacitor 60 is paralleled with the resistor 59 and the relay 7 in accordance with conventional practice. A protective capacitor 61 is also connected across the corresponding half of the secondary 57.

The reverse relay 8 is connected in a similar circuit to the opposite half of the secondary 57. Thus, during one half cycle, the upper end of the secondary 57 in the drawing connected to the anode 53 of the silicon controlled rectifier 50 is positive and biases that rectifier to conduct if a proper gate signal is applied. During this same half cycle, the opposite or lower end of the secondary 57 is negative with respect to the center tap 58 and consequently, the associated silicon controlled rectifier 51 is biased to non-conduction. Consequently, the incoming pulse train during this half cycle may effect energization of the forward relay 7. During the next alternate half cycle, the polarity across the transformer secondary 57 reverses and the forward silicon controlled relay 50 is biased to cutoff while the silicon controlled rectifier 51 is biased into conduction. During the next half cycle, relay 8 may therefore be energized.

As the A.C. signal input to the amplifier 6 is synchronized with the A.C. input signal to the transformer 56, the pulse train will be related to the desired energization of the forward and reverse relays. The unijunction circuit is set to establish a plurality of pulses during each cycle such that if one pulse does not cause conduction, a second very closely spaced pulse will cause conduction to maintain a proper feedback control. The illustrated circuit provides a rapid on-off time control eliminating the complexity of analog systems without the attendant problems of the normal pulse relay system.

The brake relay 9 is separately controlled by relays 7 and 8 to provide the previously described circuit operation. A resistor 62 is connected in series with relay 9 across a timing capacitor 63 and the paralleled circuit is connected between ground line 27 and the transformer secondary 57 in series with a resistor 64 and paralleled contacts 7-2 of relay 7 and 8-2 of relay 8. The opposite sides of the contacts 7-2 and 8-2 are connected in common by a jumper lead 65 and to the opposite ends of the secondary 56 by similarly polarized diodes 66 and 67. The diodes 66 and 67 permit conduction whenever the correspondingly connected end of the secondary is positive with respect to ground and provides a directional current through the paralleled circuit.

When relay 7 or 8 is energized, the associated contact 7–2 or 8–2 closes to complete the path to the paralleled circuit including the relay 9 and the capacitor 63 in parallel. As a result, the relay 9 is energized to close its associated contact and completes the circuit for the desired directional drive of the motor 1. The timing capacitor 63 is rapidly charged to its full holding voltage. Subsequently, when the circuit is broken through the opening of the previously closed contacts 7–2 or 8–2 the holding current to the relay 9 is discontinued. However, the capacitor 63 then discharges through the resistor 62 and relay 9 and is selected with a significant time period to maintain the contacts 9–2 closed. This permits application of a timed braking current to the motor 1 to rapidly bring it to the null position until a new error signal resets and retriggers the circuit to energize relay 7 or 8.

The operation of the illustrated embodiment of the invention may be briefly summarized as follows. The signal generator 2 generates an error signal which is applied across the gain potentiometer 21 with a phase related to the power source 12. The tap 22 of potentiometer 21 sets the level of the error signal which will be effective to operate the relays as presently described. The network 23 limits the level of the error signal and consequently prevents damage to the amplifier 6 as a result of excessive high signals.

The small error signal is amplified by the transistors 30 and 31 to a proportionate level and is applied as the input to the control transistor 32. If the error signal as set by tap 22 is of a sufficient level, the control transistor 32 is biased to cutoff and thereby effectively removes the bypass circuit across the pulse control capacitor 49. Current is then permitted to flow through the capacitor 49 which charges until the breakdown level of the unijunction transistor 33 is reached at which time capacitor rapidly and suddenly discharges through the emitter or control electrode 43, main electrode 45 and the resistor 47 to ground. The capacitor 49 continues to charge and discharge as long as the control transistor 32 is cutoff thereby providing a train of trigger pulses to the silicon controlled rectifiers 50 and 51. The pulse train as previously noted is synchronized with the A.C. input signal to the silicon controlled rectifiers 50 and 51 and consequently the pulse train will be in phase with the anode voltage of the proper silicon controlled rectifier. If the pulse train is associated with the positive half cycle and therefore in phase with the positive anode voltage of silicon controlled rectifier 50, the latter conducts and energizes forward relay 7. The motor contacts 7–1 open and the brake relay contacts 7–2 close. Brake relay 9 is then energized and instantaneously closes its associated contacts 9–1 to complete the circuit to the servo motor 1 with the power being applied directly across the forward winding 14 and across the reverse winding 15 in series with the capacitor 17. As a result, the motor 1 rotates in a forward direction and actuates controller 4 to vary the load in a manner to reduce the error which in turn will reduce the error signal. When the error signal is reduced to a level below the triggering level of control transistor 32, it again begins to conduct and creates a short circuit path across the capacitor 49 through the collector-emitter circuit to ground line 27; thereby removing the control and charging voltage from the emitter 43 of the unijunction transistor 33. As a result, the generated pulse signals cease and the conducting silicon controlled rectifier 50 reverts to the non-conducting state upon the reversal of the alternating current applied across the anode 53 and the cathode 52. As a result, the forward relay 7 is instantaneously de-energized to close its contacts 7–1 and open the associated contacts 7–2. The motor circuit will have the contacts 7–1 and 8–1 both closed to connect the ends of both the forward winding 14 and the reverse winding 15 directly to the brake winding contacts 9–1. Although the circuit to the brake winding relay 9 is opened as a result of the opening of contacts 7–2, the timing capacitor 63 discharges through the relay 9 and maintains a holding current for a selected time period which holds the associated brake contact 9–1 closed. Consequently, full line power is simultaneously applied to both the forward winding 14 and the reverse winding 15 to quickly stop the motor 1 at the null position. After a selected time interval, approximately .2 seconds has been satisfactory in circuits for motors of up to one horsepower, the current through the brake relay 9 drops below the holding level and the associated contacts 9–1 open, thereby removing power from both of the motor windings 14 and 15. This prevents any danger of damaging the motor as a result of applying full power to the motor in the stopped position.

Although the relay switching means shown in FIG. 1 provides a highly satisfactory system, any other switching system might be employed. FIG. 2 illustrates a solid state switching means providing similar functioning and control of a servo motor.

The input to the switching means of FIG. 2 and the motor control are similar to that of FIG. 1 and consequently corresponding elements are similarly numbered to provide continuity and simplicity of description. Thus, in FIG. 2 the load resistor 47 and coupling capacitors 55 and 55' of FIG. 1 have been shown and will be connected to a suitable input triggering pulse for example the unijunction transistor 33 of FIG. 1. Similarly, a main transformer 56 provides power to a switching control means and is connected to input lines 10 and 11 which are connected to the servo motor 1 as in the embodiment of FIG. 1. The elements of the motor 1 are numbered in FIG. 2 in accordance with the numbering in FIG. 1.

In the embodiment of FIG. 2, a solid state forward switch means 68 is connected to terminal 19 and a similar reverse switch means 69 is connected to terminal 18. The switch means 68 and 69 are connected to the power line 11 in parallel through a solid state brake switch means 70 to provide functioning generally similar to the relay contacts shown in FIG. 1.

Each of the switch means 68 through 70 is basically a solid state diode bridge type circuit and consequently only the forward switch means 68 will be specifically described. The corresponding elements of the reverse switch means 69 and the brake switch means 70 will be identified by corresponding primed and double primed numbers respectively.

Referring therefore specifically to switch means 68, four diodes 71 are connected in a closed loop to define a pair of circuit terminals 72 connected respectively to the brake switch means 70 and the motor terminal 19 and a pair of control terminals 73. The diodes 71 are polarized adjacent the junctions 72 to carry the current in opposite directions with respect to the corresponding terminal and toward one junction 73 and from the opposite junction 73. The path through the bridge is completed through a silicon controlled rectifier 74 connected between the junctions 73 of the bridge circuit. The silicon controlled rectifier 74 includes a gate terminal 75 which is selectively fired to establish a current path through the bridge circuit whenever direct power is to be applied to the winding 15. As hereinafter described, silicon controlled rectifier 74 is normally biased to conduct to simulate the closed switch 7–1 of FIG. 1. When it is fired to conduct, current flows during one half cycle from terminal 72, through the upper right-hand diode 71 to terminal 73, through the silicon controlled rectifier to lower terminal 73 and thus through the lower left-hand diode 71 to the other terminal 72 and then to the winding 19. During the alternate half cycle, the current flows from winding 19, terminal 72 through the upper left-hand diode 71 to upper terminal 73, the silicon controlled rectifier 75 to the lower terminal 73 and the lower right-hand diode 71 to opposite terminal 72 and therefrom to line 11 via switch means 70. The switch 68 may therefore apply power line voltage directly to winding 15 and, assuming switch 69 is open, through capacitor 17 and winding 14 to provide reverse motor rotation. If the latter switch means 69 is closed, full power is simultaneously applied to both windings 14 and 15 to provide the braking effect previously noted.

In operation, the normal state of the switch means 68, 69 and 70 is biased such that the silicon controlled rectifier 74″ of brake switch means 70 is cut off and holds the motor circuit open in the same manner as the normally open contacts 9–1 of FIG. 1. Rectifiers 74 and 74′ of switch means 68 and 69 are biased to conduct and therefore simulate the normally closed contacts 7–1 and 8–1 of FIG. 1.

The several switch means 69 through 70 are controlled by signals on the respective gate terminals 75, 75′ and 75″ to provide the desired functioning through separate trigger circuits identified as a brake trigger circuit 76, a forward trigger circuit 77 and a reverse trigger circuit 78.

The brake trigger circuit 76 is illustrated as a solid state pulse generating circuit including a monostable multivibrator 79 connected to control the energization and firing of a unijunction transistor 80. The monostable multivibrator 79 includes a pair of transistors 81 and 82 interconnected in a well known circuit to a suitable D.C. bias line 83 and a ground return. A coupling capacitor 84 connects the transistor 81 to the resistor 47 for simultaneous transmission of trigger pulses thereto and to the control switch means 68 and 69 and an output lead 85 connects the collector of transistor 82 to the unijunction transistor 80. A feedback capacitor 86 interconnects the output of transistor 81 to the input circuit of the transistor 82 to provide the desired monostable multivibrating function in accordance with well known theories of operation. The transistor 82 is connected to lead 83 in a manner to normally bias transistor 82 to conduct and hold transistor 81 cut off. When an incoming trigger pulse is received, transistor 81 conducts and rapidly cuts off transistor 82. The capacitor 86 provides a timed triggered condition before reversing to the initial condition whereby transistor 81 again cuts off and transistor 82 again conducts. This is the normal operation of a monostable multivibrator circuit and no further description thereof appears necessary or is given other than selection of capacitor as hereinafter described.

The unijunction transistor 80 has its input connected to the output of the transistor 82 via line 85 and a coupling or timing capacitor 87 connects the line 85 to ground. When transistor 82 conducts, capacitor 87 is by-passed and therefore prevents firing of the unijunction transistor 80. However, when an incoming pulse is applied via the capacitor 84 to the transistor 81, transistor 82 is cut off and the capacitor 87 immediately begins to charge until the firing level of transistor 80 is reached at which time it discharges through the unijunction transistor and establish an output pulse. An isolating and coupling pulse transformer 88 includes a primary 89 connected in series with the output circuit of the unijunction transistor 80. The secondary or output winding of the transformer 88 is connected to the gate electrode or terminal 75″ of the silicon controlled rectifier 74″ of the brake switch means 70.

In summary, in the absence of an incoming trigger pulse from the amplifying circuit shown in FIG. 1 which appears a resistor 47, the unijunction transistor 80 is held off as a result of the bypass of the charging current from the capacitor 87. Consequently, no signal is applied to the gate of the silicon controlled rectifier of the brake switch 70 and it is held in a non-conducting state to maintain an open circuit from the power line 11 to the switch means 68 and 69. When a pulse is received however transistor 80 is triggered to generate a pulse train and the switch means 70 is fired to complete the path and apply power to the switch means 68 and 69. Further, after the triggering pulses of the error signal terminate, the firing of the switch means 70 is maintained for a selected time period as a result of the proper capacitance of capacitor 86 which may produce a timed period in the order of that previously described with respect to FIG. 1; namely, .2 of a second.

The energization of the motor 1 will then be determined by the position or actuation of the switch means 68 and 69. The actuation thereof is generally similar and provided through the similar trigger circuits 77 and 78. The forward trigger circuit 77 will be described with corresponding elements of the circuit 78 identified by similar primed numbers for simplicity and clarity of explanation.

Circuit 77 includes an input control transistor 91 connected to the incoming error trigger train through the capacitor 55. The transistor 91 generally functions as a switch similar to a silicon controlled rectifier and such may in fact be employed although the control transistor as shown is generally somewhat less expensive. The control transistor 91 is serially connected with a directional diode 92, a trigger generating circuit 93 and one half of the transformer 56 to provide phase related control of the circuit, similar to that described with respect to FIG. 1. Thus, if the error pulse train is generated during one half of the cycle of the main power source supply, it will be in phase with the power supplied to the circuit including transistor 91 and diode 92. If the pulse train is in phase with the alternate half cycle, it will be in phase with the operating power applied to the transistor 91′ and diode 92′.

When the pulse train is applied to the transistor 91 in phase with the power supply polarity for conduction via diode 92, power is supplied to the trigger generating circuit 93. This circuit generally is similar to the brake trigger circuit 76 an includes a monostable multivibrator 94 connected to fire a unijunction transistor 95 in a similar manner. Generating circuit 93 includes the transistors 96 and 97 similarly interconnected through a coupling capacitor 98 which is selected however with a much shorter timing period such that it produces essentially an instantaneous turn-on and turn-off of the circuit 93. As a result, the output of the unijunction transistor 95 is rapidly turned on or turned off to simulate similar energization and de-energization of the relays 7 and 8 of FIG. 1. The output of the unijunction transistor 95 is connected through a suitable isolating and coupling pulse transformer 99 to the gate 75 of the switch means 68.

Further, in circuit 93, the input to unijunction transistor 95 is connected to the normally cut off transistor 96 via a lead 100 such that in the absence of an error signal, an output pulse train is impressed upon gate 75 to hold switch 68 closed. In the presence of an error signal, the control pulse train ceases and switch 68 opens.

The trigger circuit 78 is similarly constructed and the generating circuit 93′ is shown in block diagram with the output connected to the gate 75′ of the switch means 69.

The operation of the circuit will be briefly described as follows to more clearly show the similarity in operation to that of FIG. 1.

In FIG. 2, the normal standby condition is such that the trigger circuit 76 is cut off and the silicon controlled rectifier 74″ of switch means 70 is de-energized and therefore is an effective open circuit from the power line 11. Simultaneously, however, the trigger circuits 77 and 78 are such that output pulses are continuously supplied to fire the respective silicon controlled rectifiers 74 and 74′ of switch means 68 and 69 which provide a complete circuit path to the respective motor terminals 18 and 19.

When an error signal is received, it will be phase related in accordance with the desired forward or reverse direction of the motor 1. If a forward directional operation of the motor 1 is to be obtained the pulse is in phase with the circuit including the trigger circuit 77. As a result, operating pulses are simultaneously applied to the brake trigger circuit 76 and to the forward trigger circuit 77. The pulses to circuit 76 actuate it to generate pulses impressed on gate 75″ of the silicon controlled rectifier 74″ which conducts and applies line voltage to the inputs of the switch means 68 and 69 as in FIG. 1. Simultaneously, however, the trigger pulses to the circuit 77 are effective to de-energize or cut off the silicon controlled rectifier 74 while the silicon controlled rectifier 74″ of switch means 69 continues to conduct. Consequently, current is supplied to the motor terminal 18 via the switch means 69 and returns directly through winding 14 to the power line 10. It passes through the winding 15 however only in series with the capacitor 17 to provide a forward rotation of the motor 1. When the null position is approached in accordance with the setting of the circuit such as shown in FIG. 1, the absence of the error signal generated pulses will cause the circuit 77 to essentially instantaneously revert to its normal condition thereby turning off the trigger circuit 93 which will then again generate pulses to fire silicon controlled rectifier 74 and effectively close switch 68. This will therefore connect both windings 14 and 15 directly again to the switch means 70.

As previously noted, the trigger circuit 76 for the switch means 70 will maintain firing of the silicon controlled rectifier 74″ for a selected time period as determined by the selection of capacitor 86 and will therefore maintain the switch means 70 effectively closed. As a result, simultaneous power will be applied to both of the motor windings 14 and 15 as in the embodiment of FIG. 1.

Thus, it is seen that the present invention may employ a variety of switching means to provide the desired functioning and control.

Although the system can be applied in any suitable on-off closed loop control system, practical examples may include machine tool table positioning, valve positioning and variable speed drives. The control system however provides an inexpensive and highly accurate means for stopping an electrically responsive two-phase actuator in any system without the normal complexity attendant other types of controls.

Various modes of carrying out the invention are contemplated as being within the scope of the following claims particularly pointing out and distinctly claiming the subject matter which is regarded as the invention.

I claim:
1. A control system for accurate positioning of a two-phase induction motor having a pair of windings connected on one end by a capacitor to define a forward terminal and a reverse terminal and at the opposite end in common to define a common terminal for selective connection to a pair of alternating current power lines, said control system comprising
   a forward relay having forward contacts connected to the reverse terminal,
   a reverse relay having reverse contacts connected to the forward terminal,
   a brake relay having brake contacts connected to said forward and reverse contacts,
   circuit means including said relays and arranged to maintain said brake contacts normally open and said forward contacts and said reverse contacts normally closed,
   triggering means to selectively energize and deenergize said forward relay and said reverse relay simultaneously with said brake relay,
   an alternating current transformer having a center tapped secondary,
   a forward relay circuit connected across one half of said secondary and serially including said forward relay and a silicon controlled rectifier having a gate terminal,
   a reverse relay circuit connected across the other half of said secondary and serially including said reverse relay and a silicon controlled rectifier having a gate terminal,
   an error signal source for generating control pulses in synchronism with the alternate half cycles of the secondary voltage and connected to said gates of said silicon controlled rectifiers and thereby controlling energization of said forward relay and said reverse relay,
   a brake relay circuit connected to said secondary in series with contacts of both said forward relay and said reverse relay for simultaneous energization therewith, and
   a timing capacitor connected in parallel with said brake relay to maintain said brake relay energized for a preselected time period after opening of the circuit between the secondary and the brake relay.

2. The control system of claim 1 wherein said error signal source includes,
   an alternating current signal generator producing an error signal in synchronism with said secondary voltage and selectively of the same phase and opposite phase, and
   a unijunction transistor having an output circuit connected to the gate of the silicon controlled rectifiers and an input circuit connected to the signal means and to a power source, said transistor generating a train of pulse signals in accordance with the phase of the error signal and thereby controlling the conduction of a phase related one of said rectifiers.

3. A control system for accurate positioning of a load in response to a control signal, which comprises
   a two-phase motor having a pair of windings connected by a phase shift means,
   input terminal means to supply power to the windings with the one winding paralleled with the shift means and the other winding for controlling the direction of rotation,
   a pair of gate controlled rectifiers connected one each to the terminal means for selectively connecting said input terminal means to an alternating current input means for selectively creating driving energization in either direction,
   a forward triggering means connected to the corresponding rectifier,
   a reverse triggering means connected to the corresponding rectifier,
   alternating current input means connected to said triggering means and including control means effectively applying one half cycle to one triggering means and the opposite half cycle to the second triggering means,
   a brake gate controlled rectifier connecting said pair of controlled rectifiers to input power means,
   a brake triggering means connected to the corresponding rectifiers and
   control means for said rectifiers to energize the brake rectifier with only one of said pair of rectifiers and in response to de-energization actuation to the other of said pair of rectifiers to generate simultaneous timed energization of both windings for a selected period to provide a timed braking of the motor whereby said motor is rapidly stopped at a selected position within said selected period without damaging energizing of the motor and including error signal means coupled to said control means and being synchronized with said current input to produce an error signal in accordance with the control signal and the actual position of the load and to operate said pair of controlled rectifiers during the half cycle to reduce the error signal and to simultaneously energize the brake triggering means.

4. The control system of claim 3 wherein
said brake triggering means includes a pulse source biased to produce a pulse train in response to an error signal and having timing means to maintain said pulse train for a selected time following termination of said error signal, and
each of said forward and reverse triggering means including a pulse source normally producing a pulse train and cut off in response to an error signal.

5. The control system of claim 3, wherein
the brake triggering means includes a monostable multivibrating circuit connected to be triggered by the error signal and connected to trigger an output unijunction transistor, said transistor being connected to the multivibrating circuit to be normally cut off, and
the forward and reverse triggering means each including a solid stage switch element in series with a rectifier and pulse generating means and an alternating current power input means, alternate half cycles being effectively applied to different generating means, said error signal means being connected to said switch element, each of said generating means including a monostable multivibrator connected to be triggered by the current in the corresponding series circuit and connected to trigger a directional output unijunctional transistor, said directional output unijunction transistor being connected to the corresponding multivibrating circuit to be normally turned on.

6. The control system of claim 5, wherein each of the switch means includes a diode bridge having a pair of input terminals and a pair of control terminals with the silicon controlled rectifiers connected between said control terminals.

References Cited

UNITED STATES PATENTS 2,445,289   7/1948   Cherry _____ 318—209
3,150,303   9/1964   James et al. _____ 318—20.835

ORIS L. RADER, *Primary Examiner.*

THOMAS E. LYNCH, *Assistant Examiner.*

U.S. Cl. X.R.

318—28, 203, 207, 227